United States Patent [19]

Tamulevich

[11] Patent Number: 4,989,938
[45] Date of Patent: Feb. 5, 1991

[54] CONTINUOUSLY VARIABLE FIBER OPTIC ATTENUATOR

[75] Inventor: Thomas W. Tamulevich, Chelmsford, Mass.

[73] Assignee: Light Control Systems, Inc., Tyngsboro, Mass.

[21] Appl. No.: 476,743

[22] Filed: Feb. 7, 1990

Related U.S. Application Data

[63] Continuation-in-part of Ser. No. 241,606, Sep. 8, 1988, Pat. No. 4,904,044.

[51] Int. Cl.⁵ .................. G02B 6/26; G02B 5/20
[52] U.S. Cl. .................. 350/96.15; 350/96.21; 350/311; 350/318; 350/96.18
[58] Field of Search .............. 350/96.15, 96.16, 96.18, 350/96.31, 96.20, 96.21, 311, 314, 318, 315

[56] References Cited

U.S. PATENT DOCUMENTS

| | | | |
|---|---|---|---|
| 3,893,753 | 7/1975 | Glenn | 350/271 |
| 4,145,110 | 3/1979 | Szentesi | 350/96.15 |
| 4,186,995 | 2/1980 | Schumacher | 350/96.20 |
| 4,190,316 | 2/1980 | Malsby et al. | 350/96.18 |
| 4,257,671 | 3/1981 | Barbaudy et al. | 350/96.15 |
| 4,261,640 | 4/1981 | Stankos et al. | 350/96.15 |
| 4,364,639 | 12/1982 | Sinclair | 350/331 R |
| 4,591,231 | 5/1986 | Kaiser et al. | 350/96.18 |
| 4,639,078 | 1/1987 | Sheem | 350/96.21 |
| 4,645,294 | 2/1987 | Oguey et al. | 350/96.15 |
| 4,664,484 | 5/1987 | Hines | 350/394 |
| 4,666,243 | 5/1987 | Rogstadius et al. | 350/96.21 |
| 4,695,125 | 9/1987 | Sinclair et al. | 350/96.20 |
| 4,697,869 | 10/1987 | So et al. | 350/96.15 |
| 4,702,549 | 10/1987 | Duck et al. | 350/96.15 |
| 4,717,234 | 1/1988 | Barlow et al. | 350/96.21 |
| 4,753,510 | 6/1988 | Sezerman | 350/96.21 |
| 4,878,730 | 11/1989 | Wall | 350/96.21 |
| 4,900,124 | 2/1990 | Lampert et al. | 350/96.21 |
| 4,904,044 | 2/1990 | Tamulevich | 350/96.18 |

FOREIGN PATENT DOCUMENTS 2138161  10/1984  United Kingdom ......... 350/96.20 X

Primary Examiner—Brian Healy
Attorney, Agent, or Firm—Hamilton, Brook, Smith & Reynolds

[57] ABSTRACT

A continuously variable fiber optic attenuator which can be constructed in a size amenable to direct mounting on optical data application apparatus is presented. The attenuator utilizes a flexible filter of varying optical density which is oriented in an optical coupling region between two optical fibers. The filter can be displaced in a manner to vary the filter density in the optical coupling region and thereby vary the attenuation across the device. A resistor coupled to the attenuator provides means for calibration of the attenuator to provide a highly accurate and reproducible attenuation.

11 Claims, 2 Drawing Sheets

CONTINUOUSLY VARIABLE FIBER OPTIC ATTENUATOR

RELATED APPLICATIONS

This application is a continuation-in-part of U.S. Pat. application No. 07/241,606, filed Sept. 8, 1988, now U.S. Pat. No. 4,904,044.

BACKGROUND OF THE INVENTION

The use of optical fibers in fiber optic transmission systems has prompted the use of single fiber attenuators which allow high power transmission signals to be processed directly into signal application apparatus. In the past, such attenuators have reduced signal levels by transmitting such signals through partially opaque optical filters, by obstructing a section of the signal with attenuation filter segments, by varying the orientation between signal input and output fibers, or by diminishing signal strength via reflection from partially light absorbent elements.

For example, in U.S. Pat. No. 4,591,231, Kaiser et al. describe an optical attenuator containing a disk having a plurality of openings with fixed, neutral density filters of differing optical density contained therein. By rotating the disk, a fixed density filter of a desired opacity can be introduced into the signal path, thereby attenuating a portion of the signal. Although effective for reducing signal strength, such a system is limited in :hat attenuation levels vary in a step-wise rather than a continuous manner.

U.S. Pat. No. 4,702,549 to Duck et al. teaches a variable attenuator in which an attenuation filter is used to obstruct a segment of the transmission signal. Such attenuators tend to suffer from internal refraction and reflection problems, thereby resulting in high signal noise which reduces the effectiveness of the device.

Attenuators in which the orientation between signal input and output fibers is varied have been described in U.S. Pat. No. 4,645,294 to Oguey et al. and in U.S. Pat. No. 4,145,110 to Szentesi. In the former patent, a first optical fiber is mounted in a fixed position, while a second optical fiber is mounted on a movable surface in a manner which allows its terminal end to be moved in a circular arc about the terminal end of the fixed fiber. In the latter patent, the terminal ends of the signal input and output fibers are mounted in an apparatus which allows the axial distance between the terminal ends to be varied.

Reflective means to vary signal attenuation have been described in U.S. Pat. No. 4,664,484 to Hines and in U.S. Pat. No. 4,364,639 to Sinclair et al. This latter patent also describes the use of a liquid crystal cell to vary the transmissity of a medium through which the transmission signal passes.

Additionally, means for providing fixed attenuation are well known in the art. Such systems generally utilize a medium of fixed optical density disposed between a signal input fiber and a signal output fiber. These media can comprise isolated material placed between the signal carrying fibers as described in U.S. Pat. No. 4,257,671 to Barbaudy et al., or can comprise a coating upon the terminal end of at least one of the signal carrying fibers as described in U.S. Pat. No. 4,639,079 to Sheem.

SUMMARY OF THE INVENTION

The present invention concerns an optical attenuator having a flexible optical filter that is used for attenuating optical transmission signals. The flexible optical filter has an optical density gradient that varies along at least one of its dimensions (such as its length). It is preferred that the optical density gradient of the optical filter varies linearly along this one dimension. Transmission signals are brought to the optical filter by a first optical fiber. The transmission signals from the first optical fiber pass through the optical filter where they are attenuated. The attenuated transmission signals are then received by a second optical fiber that carries them to their desired destination.

To produce varying attenuation of the transmission signals, the optical filter is coupled to a reciprocating means. The reciprocating means moves the optical filter along the direction in which the filter's optical density gradient varies to generate different levels of attenuation. Choices of reciprocating means include a variable resistor that has a slider member coupled to it. The slider member is translatable along a resistive coil of the resistor. The translation along the resistive coil provides the movement necessary to reposition the optical filter so as to adjust the resulting attenuation and also provides a direct electrical indication of the filter position.

In accordance with one embodiment, the attenuator may include connecting optical fibers. They provide optical coupling between the first and second optical fibers and the optical filter. These connecting fibers carry the transmission signals over a curved path to and from the optical filter. In accordance with another embodiment, such connecting optical fibers are not used; rather, optical alignment means are used to provide optical coupling. A preferred type of optical alignment means are ferrules. The ferrules, and thus the fiber types, preferably have arc-rounded ends directed towards the optical filter. The arcs remove a great deal of the divergence of the transmission signals as they exit and enter the respective fibers. The ferrules may be positioned in a connecting ferrule that has a transverse slot to assist in positioning the optical filter in a substantially orthogonal position relative to the optical fibers.

DETAILED DESCRIPTION OF THE INVENTION

Figure 1:
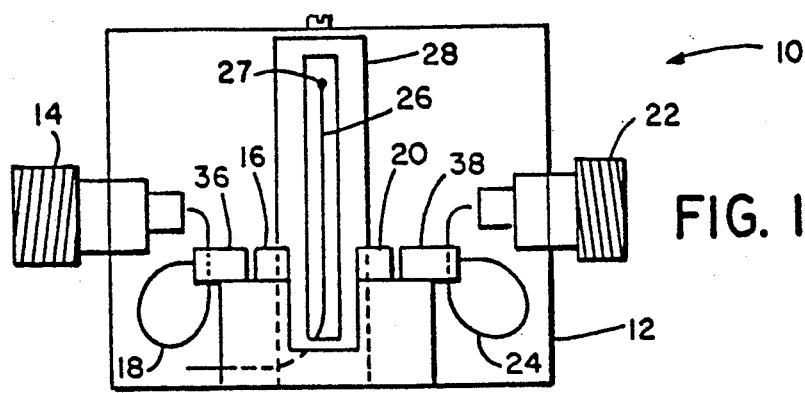
FIG. 1 is a schematic representation of the continuously variable fiber optic attenuator of one embodiment of the present invention.

A continuously variable optical attenuators of the present invention is depicted schematically in FIG. 1. In this Figure, the optical attenuator 10 comprises a housing 12, containing a first optical fiber connector 14, a first optical lens 16, a first connecting optical fiber 18, a second optical lens 20 separated from the first optical lens 16 by an optical coupling region, a second optical fiber connector 22, a second connecting optical fiber 24, an optical filter 26 and a reciprocating means 28. Each of the connecting optical fibers 18 and 24 serves to couple its corresponding connector to its corresponding lens, to thereby provide optical communication therethrough. The connecting optical fibers allow the optical fiber connectors to be oriented in any manner which is desirable for the overall package design. This is because the fibers 18 and 24 allow movement between the lens and connector even if the lens is to be maintained in a fixed, precise position. By allowing the fiber connectors 14 and 22 to be located off the axis of the optical coupling region, design flexibility is achieved. Furthermore, by mounting connectors 14 and 22 directly on housing 12, the likelihood of device damage by a steady or sudden tension applied to one or both of the connectors is greatly diminished. By using connecting fibers 18 and 24 between each connector and lens, each of the optical lenses can be maintained in optical alignment to thereby allow optical communication between the first lens 16 and the second lens 20 despite nonalignment between connectors 14 and 22. In one embodiment, the lenses comprise gradient index lenses. Such lenses generally comprise glass rods subjected to doping using a variety of ions to provide an index of refraction which varies through the lens cross section. Alternatively, the lenses can comprise aspherical lenses. In this preferred embodiment, however, the lenses comprise spherical, ball lenses. Although such ball lenses have been suggested for optical fiber applications, prior to the present invention, their use has proven less than satisfactory.

Although a variety of means for mounting connecting optical fibers 18 and 24 within the device can be used, the preferred method is to terminate the fibers in fiber positioning sleeves 36 and 38 which are mounted to maintain the fibers in proper alignment. This method is preferred, since precise positioning of the sleeves 36 and 38 is simpler than precise positioning of exposed connecting fibers 18 and 24. As such, the use of fiber positioning sleeves 36 and 38 enhances the ease of manufacturing the device.

The optical filter 26 is a flexible film having an optical density gradient which varies along its length. Although, in the preferred embodiment the filter has neutral density (i.e., it absorbs light over virtually the entire visible spectrum), the invention is not intended to be so limited. Rather, any of a variety of chromatic filtering schemes can be suitable for use in the present invention. The filter 26 is preferably mounted in an orientation which is substantially orthogonal to the optical axis within the optical coupling space between each of the lenses 16 and 20. Although in the past it has been suggested that the filter be maintained nonorthogonally to the optical axis to minimize back reflection, the present system of separate lenses 16 and 20 is believed to eliminate the need to do so. Additionally, antireflection coatings can be used on the lenses and filter to further reduce back reflection.

The filter should be of a length long enough to allow top and bottom portions of said filter to extend beyond the periphery of each lens. This allows the filter to be moved in a manner which varies the filter density in the optical coupling region without the risk of withdrawing the filter from the optical coupling region. The filter 26 is operably connected to the reciprocating means 28 in order to vary the vertical position of the filter within the optical coupling space between lenses 16 and 20. As the density of the filter is a gradient along its length, such vertical movement serves to provide areas or regions of differing optical density disposed in the optical coupling space between the lenses. This differing optical density region transmits and absorbs differing amounts of light, thereby providing a continuously variable filter means between the lenses. By varying the vertical position of the filter, the degree of light attenuation across the device can be varied.

In a preferred embodiment, the reciprocating means 28 is a linear or logarithmic variable resistor having a sliding member which can be translated along a length of resistance coil. By operably connecting the filter 26 to the sliding member of the variable resistor, such as with pin 27, the filter is caused to be vertically displaced as the position of the sliding member is altered by external adjustment of the resistor. Thus, adjustment of the variable resistor causes displacement of the filter and, therefore, variation in the attenuation characteristic in the optical coupling regions between the lenses.

The use of a variable resistor as a reciprocating means allows a simple method for determining attenuation via resistance measurement. A calibration curve can be determined either during manufacture or thereafter to compare the attenuation to the resistance value of the variable resistor. The device attenuation can then be simply determined using an ohmmeter and the predetermined calibration curve. Thus, as the variable resistor is adjusted, as in field use, a highly accurate and reproducible attenuation across the device can be produced.

Figure 2:
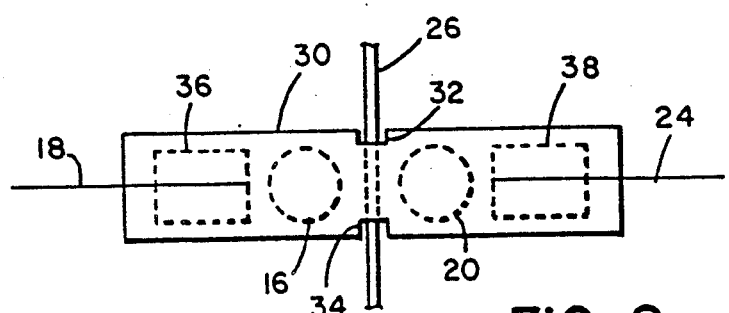
FIG. 2 is a schematic representation of an optical alignment system useful with the continuously variable fiber optic attenuator of one embodiment of the present invention.

The lenses are preferably maintained in optical alignment by the structure schematically depicted in FIG. 2. In this figure a connecting ferrule 30 having two radially opposite openings 32 and 34 along its axial length serves as an alignment means for the lenses 16 and 20. Each of the connecting fibers 18 and 24 is preferably terminated in fiber positioning sleeves 36 and 38 to maintain each in alignment with its corresponding lens. The radially opposite openings 32 and 34 provide a passage through the ferrule 30 through which the filter 26 travels. Additionally, said openings serve to maintain the filter in the preferred substantially orthogonal orientation in the region between the lenses. Although the use of ferrule and fiber positioning sleeves is preferred, it must be pointed out that such an apparatus is not intended to be limiting. Rather, any method which maintains the filter in a substantially orthogonal orientation to the optical axis between the optically aligned fibers and lenses is intended to be included herein.

The lenses 16 and 20 are preferably either spherical, ball lenses or gradient index lenses of a size amenable to use on the scale of single optical fibers. The lenses are also preferably antireflection coated to minimize losses and noise resulting from light reflection within the device. In a most preferred embodiment, the first connecting optical fiber has a terminal end which is positioned within the focal length of the first lens. Such a positioning results in a collimated, parallel light beam exiting the first lens and traveling through the optical coupling region. Upon encountering the second lens, the collimated, parallel light beam is converted into an extended, narrow focusing cone upon exiting the second lens. Since the focusing cone is extended, the positioning of the terminal end of the second connecting fiber is allowed a large variability without unsatisfactory losses. Such a configuration reduces the required accuracy of fiber positioning and therefore enhances the ease of manufacturing the device. Again, although such a configuration is preferred, the device is not intended to be so limited. Since placement of the first connecting optical fiber within the focal length of the first lens results in a collimated, parallel light beam exiting that lens, the placement of the second lens is allowed a large variation. For example, a distance between the lenses of up to about 20 mm is not expected to significantly decrease device performance. In the preferred embodiment, however, the lenses spacing is less than about 0.5 mm.

The filter is preferably a flexible polymeric film having a gradient optical density which varies along its length. In the preferred embodiment, the filter is of neutral density, however, in some applications chromatic filters are desirable. An optical density which varies in a linear manner from one peripheral end of the film to the other is most preferred and can be readily obtained photographically. Such a filter is readily available from a number of commercial suppliers. By providing a filter which is flexible, filter sections which are not located within the optical coupling region for a given attenuation can be bent out of the orthogonal orientation to the optical axis. This allows further minimization of the device package size. The dimensions of the attenuator housing can be minimized, thereby providing an attenuator which is more favorably suited to direct mounting on optical data application apparatus than the attenuators of the prior art. The flexible nature of the filter is apparent in FIGS. 1 and 2, in which filter 26 is seen to be bent and horizontally displaced in an area below the optical coupling region between the lenses. Alternatively, the filter can consist of optically transparent and opaque regions, the proportion of which vary over the vertical length of the filter. Although such a filter will provide a variable attenuation along its vertical length, such configurations are suspected of causing decreased attenuator performance as a result of light refraction within the device.

In the preferred embodiment, the lenses and filter have an anti-reflective coating thereon. This coating serves to minimize back reflection within the device, providing therefore enhanced device performance. Furthermore, the use of the separate lenses 16 and 20 is believed to further reduce back reflection within the device.

The optical fiber connectors 14 and 22 can be any combination of standard male or female optical fiber connectors with the device application determining the variety to be provided. As such, the device can have two male connectors, two female connectors or one each of a male and a female connector. Alternatively, any connector means, such as a pigtail or an optical fiber splice can be used.

Figure 3:
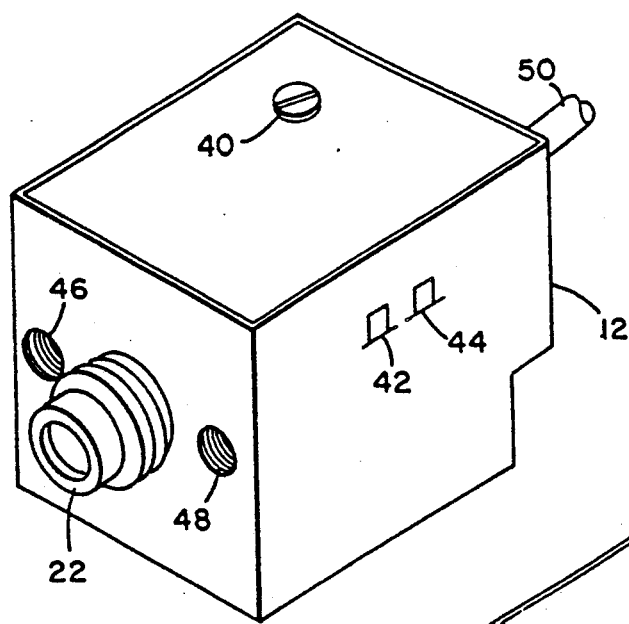
FIG. 3 is a schematic representation of an external view of one version of an embodiment of the present invention.

FIG. 3 is a representation of a typical continuously variable fiber optic attenuator of the present invention. In FIG. 3, a housing 12, comprising any structural material, but preferably aluminum or thermoplastic is utilized to contain the apparatus. One of the fiber optic connectors 22 is seen to exit one wall of the device. The other fiber optic connector exits the housing through the wall opposite that of connector 22. In this representation, the fiber optic connector exiting the rear wall of the attenuator is obstructed from view, however, a section of fiber optic cable 50, which is attached to the connector is shown. The reciprocating means is varied by rotating adjustment screw 40, in either a clockwise or counterclockwise manner. In the embodiment in which the reciprocating means is a variable resistor, resistor contacts 42 and 44 exit the housing 12 in order to allow determination of the resistance value for calibration or attenuation adjustment purposes. In one embodiment, the housing 12 includes screw holes 46 and 48 which allow the housing to be firmly mounted to optical fiber application apparatus. The number and orientation of screw holes can be varied depending upon the specific apparatus to which the attenuator is to be affixed. Alternatively, the screw holes can be supplemented or replaced by mounting lugs. In yet another embodiment the attenuator can be mounted via adhesives, brackets, hook and loop fabric or other standard attachment means.

Figure 4:
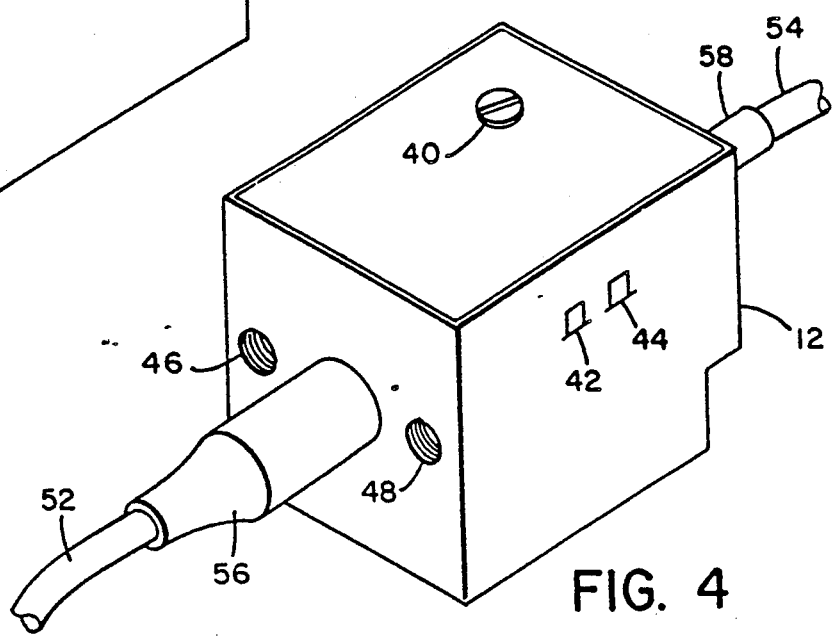
FIG. 4 is a schematic representation of an external view of a second version of an embodiment of the present invention.

FIG. 4 is a representation of another embodiment of a typical continuously variable fiber optic attenuator of the present invention. In FIG. 4, the housing 12, the adjustment screw 40, the resistor contacts 42 and 44, and the screw holes 46 and 48 are and operate as previously described. In this embodiment, however, optical fiber cables 52 and 54 are coupled directly into the attenuator as pigtails. Sleeves 56 and 58 of either a flexible or rigid material serve to position the cables 52 and 54 as they enter housing 12. In this embodiment, the first and second optical fiber connectors, as well as the first and second connecting optical fibers are eliminated. Rather, the optical fiber contained within each pigtail cable is oriented in direct optical communication with its corresponding lens. In such an embodiment, the optical fiber cable is not demountable from the attenuator at the attenuator housing. As before, the attenuator of this embodiment can be mounted to optical fiber application apparatus by alternate means such as mounting lugs, adhesives, brackets, hook and loop fabric or other standard attachment means.

It should be pointed out that the embodiments presented in FIGS. 3 and 4 are not intended to limit the attenuator to the specific cable attachment means presented. Rather, the attenuators of the present invention can be fabricated having any combination of male connectors, female connectors and pigtails.

The embodiments of FIGS. 3 and 4 are particularly useful in conjunction with optical fiber application apparatus such as fiber distribution units manufactured by ADC Telecommunications, NEC, AT&T, GTE, Telect and others. This is a result of the small device size, the ease with which the device may be added to or removed from the optical system, the ease with which the device can be adjusted to a desired attenuation value, and the ease in mounting and demounting the devices from the equipment.

Figure 5:
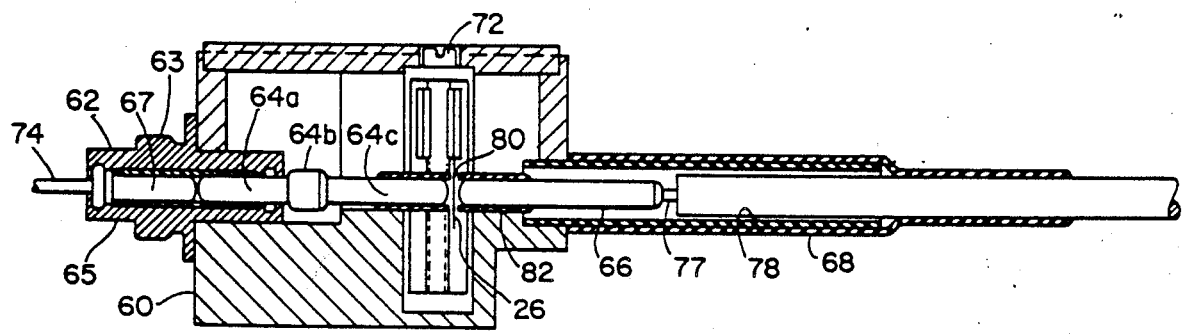
FIG. 5 is a cross-sectional view of the continuously variable fiber optic attenuator of an alternative embodiment of the present invention.

FIG. 5 depicts yet another variable optical attenuator of the present invention. This embodiment is largely similar to the previously described embodiments, for it has a housing 60 for holding the major components of the attenuator, and it relies on the same type of reciprocating means. It also has an optical filter 26 like those previously described. This embodiment, however, does not use lenses or connecting optical fibers like the previous embodiments. Instead, it relies on a unique ferrule configuration to provide optical coupling.

In accordance with this embodiment, optical transmission signals are carried over an optical fiber such as 74. The fiber 74 is connected to the attenuator housing 60 through a D4 adapter 62. D4 adapters are well known in the prior art. The D4 adapter 62 depicted in FIG. 5 accepts the fiber 74 and provides a proper interface for the fiber 74 with the attenuator housing 60. A nut 63 is provided in the adapter to secure the adapter 62 to the housing 60.

Figure 6:
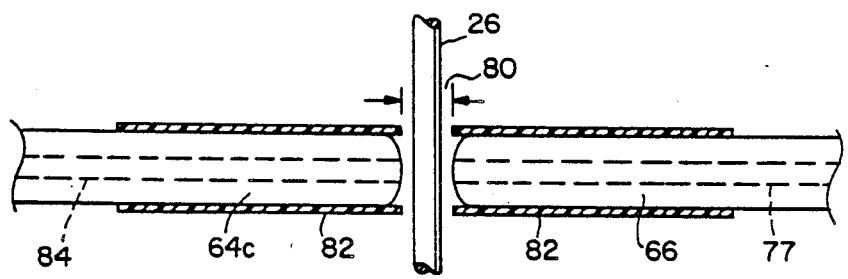
FIG. 6 is a larger scale view of the central section of the continuously variable fiber optic attenuator.

The adapter includes a sleeve 65 in which a ferrule 67 is disposed. The ferrule 67 is epoxied inside the sleeve to properly secure it. The ferrule 67 serves to receive a leading portion of the fiber 74 and appropriately position this portion of the fiber 74. The leading face of the ferrule 67 may be flat or alternatively rounded such as shown in FIG. 5. Directly abutting the face of the ferrule 67 is the rounded and polished trailing face of a fiber bridge. The fiber bridge is comprised of three sections 64a, 64b and 64c. Sections 64a and 64c are ferrules that are connected by a connecting section 64b. A continuous segment of optical fiber runs through these three sections 64a, 64b and 64c. The trailing end of the fiber is rounded and polished like the face of the bridge 64a that abuts ferrule 67. Thus, signals carried by the optical fiber 74 are transmitted to the segment of fiber 84 (FIG. 6) in the fiber bridge. The signals are then carried over this fiber 84 that runs the length of the fiber bridge to the attenuating filter 26. The fiber bridge serves primarily to provide optical coupling and proper alignment of fibers. No lens is needed to provide optical coupling between the fiber bridge and filter because of the close proximity of the leading section 64c of the bridge to the filter 26 and because the leading section of the fiber has a rounded and polished face that prevents undue divergence of the transmission signals as they travel to the filter 26.

After the transmission signals pass through the filter 26, they travel to another optical fiber positioned within ferrule 66 with the fiber therein. This ferrule 66, like its counterpart 64c on the other side of the filter, has a rounded and polished face to minimize undue loss in the transmission signal. The optical fiber 77 runs the length of the ferrule 66c. The fiber continues through a cable 70 to a pigtail at a remote location. The ferrule 66 and cable are secured by epoxy within a sleeve 78 which is in turn surrounded by a protective heat shrink boot 68. As can be seen in FIG. 5 the tail end of the cable is covered purely with the heat shrink boot 68.

Proper positioning of the fiber in the leading section 64c and proper positioning of the fiber 77 that passes through ferrule 66 is critical to correct operation of the attenuator. To assist in simplifying the task of positioning, the attenuator includes a sleeve 82 in which the ferrule 66 and the leading position 64c of the fiber bridge are disposed. This section of the attenuator is shown in more detail in FIG. 6. The ferrule 66 and leading position 64c of the bridge are epoxied inside the sleeve to secure them once they are properly positioned. Ideally, the separation between the two should be about 0.02 inches. A slot 80 is provided in the sleeve to allow the filter 26 to pass vertically through the sleeve 82. This slot 80 is approximately 0.02 inches wide. This width provides adequate space for the filter 26, which has a thickness of close to 0.015 inches.

The filter 26 is coupled to the wiper of a resistor such as previously described. The filter 26 may be moved like its previously discussed counterpart to adjust the level of attenuation. This filter, however, differs from the other described filters in that it is smaller. It has a much more condensed optical gradient. It is small enough that the excess unused portion of the filter does not need to bend under the fiber as the previously described embodiments require. This filter 26 is, nevertheless, still flexible. The flexibility provides greater tolerance in positioning the filter relative to the slot and fibers.

The filter 26 may be moved by an adjustment screw 72. The screw 72 acts as previously described with reference to the other embodiments. It should be noted, nevertheless, that the screw 72 is not intended to be the sole alternative for moving the filter. Other reciprocating means are intended to be embodied within the present invention.

The above description of this embodiment assumed that the transmission signals originated from the fiber 74. The embodiment was described in this manner purely for illustrative purposes. The transmission signals may also originate from the pigtail side of the apparatus. This embodiment is designed to attenuate in both directions of transmission and works equally well for both directions. Furthermore, the above description of this embodiment focused on an adapter-pigtail version of the embodiment. A pigtail-pigtail embodiment is equally viable. In such a version, the adapter side of the attenuator (i.e. The left hand side of the attenuator as shown in FIG. 5) is replaced with another pigtail arrangement. Still further an adapter-adapter version and a pigtail-adapter are equally viable.

The variable optical attenuators of the type described herein preferably provide a continuously variable attenuation over the range of about $-3$ to about $-30$ dB. They are expected to operate within the range of between about 0° to about 50° C., however, these temperatures are not intended to limit the device. Such devices can be constructed to be compatible with both single mode and multimode optical fibers depending upon their intended application. Finally, they are intended to be compatible with most commercially available fiber distribution panels, fiber splice boards and panel mounts for fiber optic equipment.

Those skilled in the art will recognize or be able to ascertain, using no more than routine experimentation, many equivalents to the specific embodiments of the invention described herein. Such equivalents are intended to be encompassed in the following claims.

I claim:

1. An optical attenuator for attenuating transmission signals, comprising:
   (a) a flexible optical filter having a varying optical density gradient along at least one of its dimensions;
   (b) a first optical fiber for carrying the transmission signals to the flexible optical filter;
   (c) a second optical fiber for receiving resulting attenuated transmission signals from the flexible optical fiber; and
   (d) a reciprocating means for moving the flexible optical filter along the at least one dimension over which the optical density gradient varies as to adjust a level of attenuation of the transmission signals.

2. An optical attenuator as recited in claim 1 further comprising connecting optical fibers that carry the transmission signals over a curved path to the flexible optical filter from the first optical fiber and to the second optical fiber from the flexible optical filter.

3. An optical attenuator as recited in claim 1 wherein the reciprocating means is a variable resistor having a slider member that is translatable along a length of a resistive coil of the resistor.

4. An optical attenuator as recited in claim 1 wherein the flexible optical filter has a varying optical density gradient along its length.

5. An optical attenuator as recited in claim 1 wherein the flexible optical filter's optical density gradient varies linearly.

6. An optical attenuator for attenuating transmission signals, comprising:
   (a) a flexible optical filter having a varying optical density gradient along at least one of its dimensions;
   (b) a first optical fiber for carrying transmission signals to the flexible optical filter;
   (c) a second optical fiber for receiving attenuated transmission signals from the flexible optical filter;
   (d) optical alignment means coupled to the first optical fiber and the second optical fiber, respectively for properly positioning the first and second optical fibers relative to each other and the optical filter;
   (e) a reciprocating means for moving the flexible optical filter along the at least one dimension over which the optical density gradient varies so as to adjust a level of attenuation of the transmission signals.

7. An optical attenuator as recited in claim 6 wherein the optical alignment means are ferrules, and the ends of the ferrules that face the flexible optical filter are arc-rounded to improve optical coupling.

8. An optical attenuator as recited in claim 6 wherein the reciprocating means is a variable resistor having a slider member that is translatable along a length of a resistive coil of the resistor.

9. An optical attenuator as recited in claim 6 wherein the optical density gradient of the flexible optical filter varies linearly along its length.

10. An optical attenuator as recited in claim 6 wherein the flexible optical filter is maintained substantially orthogonal to the first and second optical fibers.

11. An optical attenuator comprising:
   (a) a first ferrule for positioning a first optical fiber relative to a variable attenuating filter;
   (b) a second ferrule for positioning a second optical fiber relative to the variable attenuating filter; and
   (c) a sleeve for holding the first ferrule and second ferrule, the sleeve having a slot through which the variable attenuating filter passes and through which the filter may reciprocate to adjust attenuation.

* * * * *